United States Patent [19]
Buzbee

[11] Patent Number: 5,909,578
[45] Date of Patent: Jun. 1, 1999

[54] USE OF DYNAMIC TRANSLATION TO BURST PROFILE COMPUTER APPLICATIONS

[75] Inventor: William B. Buzbee, Half Moon Bay, Calif.

[73] Assignee: Hewlett-Packard Company, Palo Alto, Calif.

[21] Appl. No.: 08/719,854

[22] Filed: Sep. 30, 1996

[51] Int. Cl.[6] .................................................. G06F 9/45
[52] U.S. Cl. ........................................... 395/704; 395/709
[58] Field of Search ................................. 395/704, 705, 395/709

[56] References Cited

U.S. PATENT DOCUMENTS 5,333,304  7/1994  Christensen ..................... 395/183.01
5,689,712  11/1997  Heisch .................................. 395/704

Primary Examiner—Robert W. Downs

[57] ABSTRACT

A method and system for burst profiling an application program. The native application executes free and unfettered for a first time period. Then, the native application is halted and is instrumented by a dynamic translator. The dynamic translator translates and instruments code blocks of the application as the application is executing. The instrumented application executes and gathers profile data for a second time period. When the second time period expires, the dynamic translator continues to execute the instrumented application until it reaches a known state. Then, the instrumented application is halted at that known state. Next, the native application resumes execution from the known state. This process repeats until either the application finishes execution or enough profile data has been collected.

18 Claims, 3 Drawing Sheets

USE OF DYNAMIC TRANSLATION TO BURST PROFILE COMPUTER APPLICATIONS

TECHNICAL FIELD OF THE INVENTION

This invention pertains in general to optimizing compilers and in particular to a method and system for burst profiling.

BACKGROUND OF THE INVENTION

A computer program is typically written in a high-level programming language. This high-level program, or source code, is then compiled by a compiler into object code. The object code is further processed and eventually turned into an executable program.

When compiling the source code, it is important that the compiler generate object code that optimizes use of computer resources. Often, it is necessary to examine the execution of the compiled program to determine when and where optimization is required. A "profiler" is a software tool that examines the execution of a program. By examining a profiler's output, a programmer can learn which regions of the profiled program will benefit from additional optimization.

Generally speaking, techniques used by current software-based profilers can be divided into two camps: sampling and instrumenting. In sampling, the profiled program is periodically halted and its state is then examined. Given enough samples, sampling can obtain a relatively good representation of the program's behavior.

In instrumenting, code is added to the profiled program. When the program is executed, the instrumentation code gathers statistics about the program's behavior. Since the instrumentation code is present and operating during the entire execution of the program, instrumenting can produce extremely detailed profile information.

Both of these techniques, however, suffer significant drawbacks. Sampling only provides states of the program at particular instants in time. Sampling provides only little, if any, information about how the program reached each particular state. Instrumenting, on the other hand, provides detailed information about the state of the program, but is extremely computationally expensive. That is, an instrumented application executes very slowly.

Therefore, there is a need in the art for a profiler that provides detailed information at a low cost.

That is, there is a need in the art for a profiling technique that produces the detailed information available through instrumenting while executing at the speed associated with sampling.

SUMMARY OF THE INVENTION

The above and other needs are met by a method and system for burst profiling an application. Burst profiling is the technique of gathering profile information in "bursts." In general, the profiled application runs free and unfettered, but is periodically stopped and then resumed with inserted instrumentation code. After a short period of time, the application is stopped again, the instrumentation code is removed, and unfettered execution resumes until it is time for the next burst. This technique is lightweight in that most of the time the application runs free and at full speed. Yet this technique yields more kinds of and more detailed information than sampling because it takes instrumentation traces rather than single-point snapshots.

The present invention implements burst profiling by using operating system signals and timers in combination with a dynamic translation system (DTS). Before the profiled application is executed, a system call sets a timer to fire after a predetermined interval. Then, the application is allowed to execute free and unfettered.

When the timer fires, the operating system generates a machine state snapshot and sends a signal to the profiler. The profiler catches this signal with a special handler. Then, the handler retrieves the snapshot of the computer system's machine state and invokes the DTS.

From the machine state, the DTS determines the address where execution of the application was stopped. The DTS does a lookup on the address to determine if it has a block of translated code corresponding to that address. If the DTS has such a block, it executes the block. Otherwise, the DTS fetches, translates, and instruments a block of code beginning at that address. This added instrumentation code can perform any desired type of profiling. The translated and instrumented block is saved in a cache and executed.

The DTS continues to translate, instrument, and execute the profiled application until the timer fires again. Then, the DTS stops the emulation process at a known state and asks the operating system to send the signal again. This time, when the signal is caught by the handler, the handler recognizes the known state at which the signal was sent and builds a snapshot representing the state of the emulated application.

Next, the handler resets the timer. Finally, the handler replaces the real machine snapshot constructed by the operating system with the snapshot the handler constructed representing the emulated state of the application. Then, the handler returns and transfers control to the native application. This process repeats until execution of the application is complete.

A technical advantage of the present invention is that it provides detailed profiling information at a low cost.

A corresponding advantage of the present invention is that the profiled application can be executed relatively quickly and without the speed penalties normally associated with instrumenting.

Another technical advantage of the present invention is that the translated and instrumented code can perform any type of profiling.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 4:
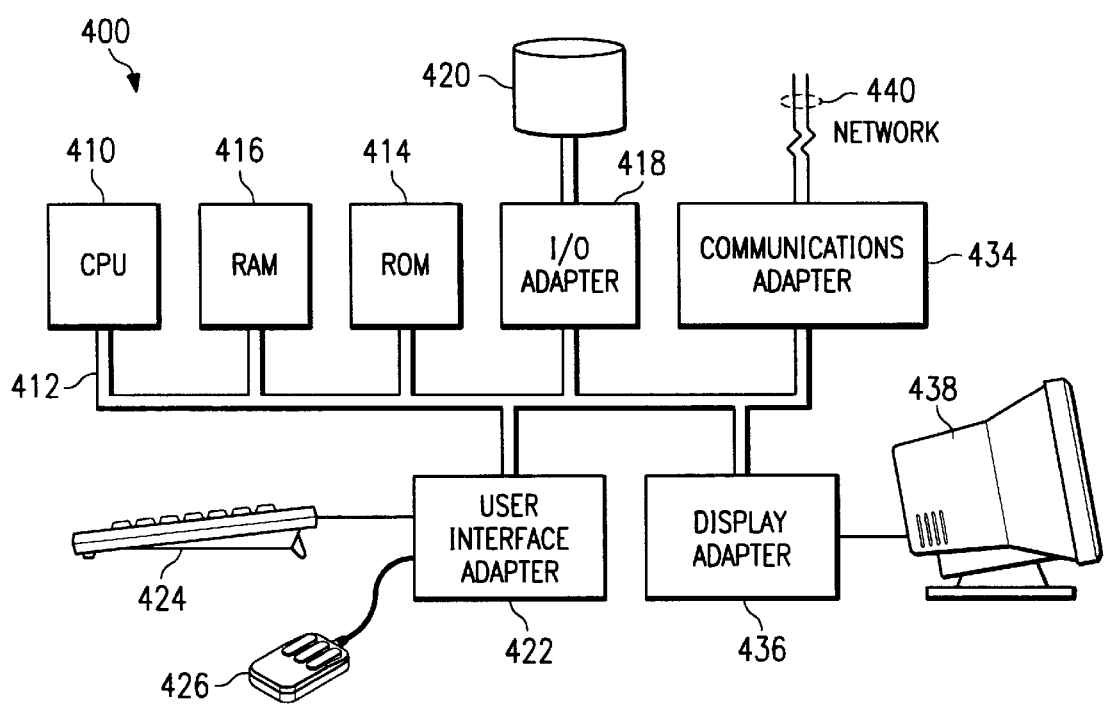
FIG. 4 is a high level block diagram of a computer system adapted to implement the present invention.

FIG. 4 illustrates a computer system 400 adapted to execute the present invention. Central processing unit (CPU) 410 is coupled to bus 412. In addition, bus 412 is coupled to random access memory (RAM) 416, read only memory (ROM) 414, input/output (I/O) adapter 418, communications adapter 434, user interface adapter 422, and display adapter 436.

CPU 410 may be any general purpose CPU, such as a HP PA-8000. However, the present invention is not restricted by the architecture of CPU 410 as long as CPU 410 supports the basic signal handling operations described below.

RAM 416 and ROM 414 hold user and system data and programs as is well known in the art. I/O adapter 418 connects storage devices, such as hard drive 420, to the computer system. Communications adaption 434 is adapted to couple the computer system to a local or wide-area network 440. User interface adapter 422 couples user input devices, such as keyboard 424 and pointing device 426, to the computer system. Finally, display adapter 436 is driven by CPU 410 to control the display on display device 438.

As used herein, the term "profiler" refers to a software program for gathering statistics about another program's behavior. The term "application" refers to a software program that is being profiled by the profiler. The phrase "native application" refers to a version of the application that has not been instrumented with profiling code. The term "operating system" (OS) refers to a software program that executes on and controls the computer system. A preferred embodiment of the present invention uses the HP-UX OS, although it could easily be adapted to execute on other variants of *NIX or different OS's. As is well known in the art, such software programs typically reside on hard drive 420 and are executed from RAM 416.

Figure 1:
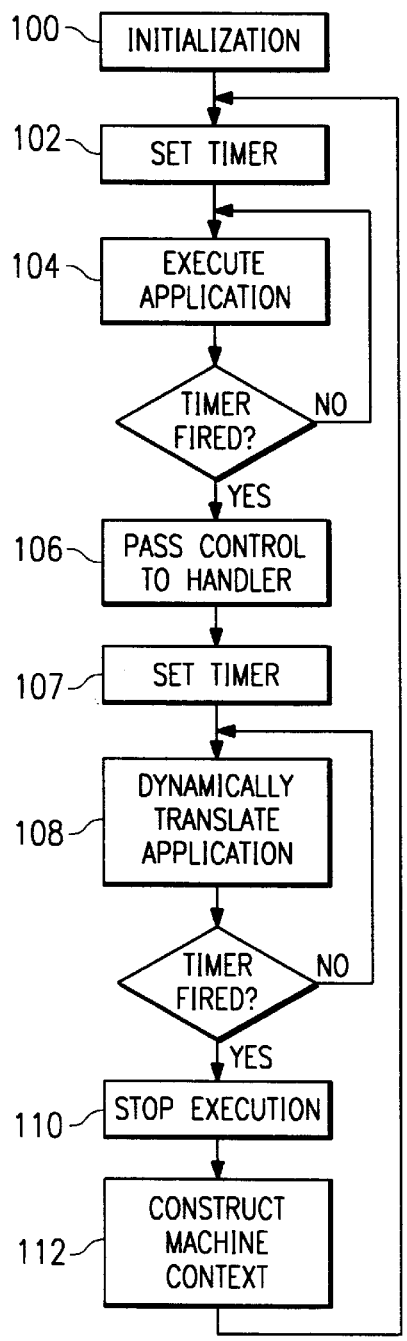
FIG. 1 is a high-level flow chart illustrating the steps performed when burst profiling an application.

FIG. 1 is a high level flow chart illustrating the steps performed by the profiler when burst profiling an application. At step 100, the dynamic translation system (DTS) is initialized. A primary function of this initialization process is to create and allocate a separate stack and heap for the DTS. Thus, two sets of heaps and stacks will exist in the computer system: one set for the native application and one set for the DTS.

At step 102, the profiler sets a timer to fire at a predetermined time interval. A preferred embodiment uses a time interval of 1/100 of a second, but obviously the interval can vary. Also, the interval can be set to different time values at different points in the profiling process. In addition, the profiler arms the timer with a signal handler. As is well known in the art, the signal handler is a software program that is invoked when the timer is fired. Then, at step 104, the profiler transfers control to the application.

The application executes free and unfettered until the timer fires. When the timer fires, the OS signals the profiler (step 106). The profiler catches the signal with the handler that was armed in step 102. In addition, a parameter is passed to the signal handler having a complete snapshot of current machine (computer system 400) state.

At step 107, the signal handler arms the timer to again fire after the predetermined interval. Then, at step 108, the signal handler passes the snapshot of the machine state to the DTS. The DTS is discussed in more detail below. At this point, however, the dynamic translator can be considered a generic machine simulator that does profiling.

Once the DTS receives the snapshot, the DTS switches to its own stack and heap and simulates execution of the application beginning at the point of the snapshot. While simulating execution, the DTS can gather any statistics that could have been learned by instrumenting the code using traditional profiling techniques.

At step 110, the timer again fires. In response, the signal handler is again invoked. This time, the signal handler tells the DTS that the timer has fired. The DTS, however, continues to simulate execution until it reaches a state that directly corresponds to a state in the native application.

Once the DTS reaches such a state, it stops its simulation and requests that the OS send the timer signal again. This time, the signal handler recognizes that the DTS has stopped simulation. Therefore, the signal handler builds a simulated machine state representing the state of the simulated application (step 112). Next, the handler resets the timer to fire again after the predetermined interval. Finally, the handler replaces the real machine state generated by the OS with the simulated machine state. When the handler returns, the operating system causes execution to resume in the native application.

Once the application begins executing again, the profiler loops back to step 104. When the timer fires again, the profiling process repeats itself. This profiling process is repeated as necessary until enough information about the application is gathered or the application finishes execution.

Figure 2:
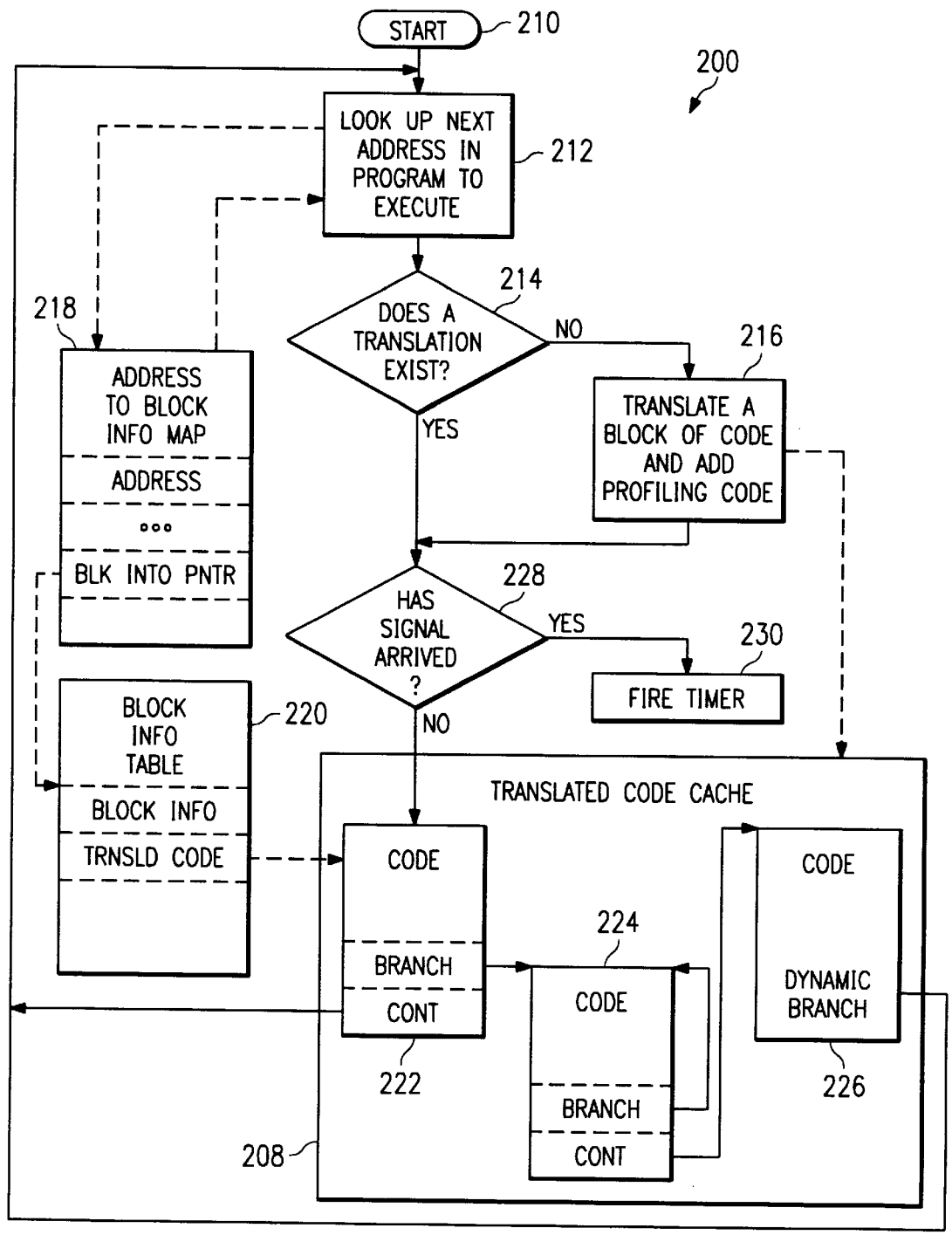
FIG. 2 is a functional block diagram of the dynamic translation system.

FIG. 2 is a functional block diagram of the DTS 200. Note that certain boxes in FIG. 2 represent steps performed by DTS 200 while other blocks represent logical components within DTS 200. Specifically, boxes 208, 210, 212, 214, 228, and 230 represent steps performed by DTS 200. In contrast, blocks 218, 220, 222, 224, and 226 represent logical components of DTS 200. DTS 200, itself, can be integrated into the OS or a separate application on the computer system. Regardless of how it is implemented, DTS 200 functions like a dynamic loader in that it executes when required.

At box 210, DTS 200 receives the machine state snapshot that was generated at step 106. This snapshot contains the values of all of the registers in CPU 410. One such register value is that of the program counter (PC), which identifies the next instruction to execute. Next, at box 212, DTS 200 looks up the instruction identified by the PC in address map table (AMT) 218.

AMT 218 is a table containing a mapping between addresses in the native application and corresponding blocks of translated code in the translated application. If a block has been translated, then AMT 218 will contain a pointer to a location within block information table 220. Block information table 220, in turn, contains a pointer the translated code block within translated code cache 208. At this point in the execution, however, the table lookup in AMT 218 will fail since the application has not yet been translated. This failure is shown by the "no" branch from box 214 to box 216.

Accordingly, DTS 200 moves to box 216. At box 216, DTS 200 retrieves a block of code from the native application beginning at the instruction identified by the PC. A preferred embodiment of the present invention retrieves a basic block of application code. However, any granularity of block size can be used. In general, the block size should be selected such that it can be efficiently translated by DTS 200.

In box 216, DTS 200 translates the native code block into a new block of code that performs the same function as the native block. In addition, DTS 200 instruments the new code block with profiling instructions. By using this type of dynamic instrumentation, a wide variety of profile information can be gathered. For example, different instrumentation code can be included to perform: opcode counting, branch prediction modeling, trace selection, and cache modeling. Further, the type of information gathered can be changed dynamically based upon previously gathered information. For example, the profiler could start off with simple profiling to see what code is being executed most frequently. Then, the translations could be discarded and new translations build which gather more detailed information.

While translating the code block, DTS 200 also checks to see whether the targets of a terminating branch statement can be replaced with the addresses of translated code blocks. Typically, the execution of a basic code block will terminate at a branch instruction. Either the branch will be taken or the code will fall through to the next block. Therefore, it is helpful to think of the terminating branch as having a taken target and a not taken target. When DTS 200 translates the code block, DTS 200 checks whether the targets of the terminating branch instruction have already been translated. If so, then DTS 200 inserts the address of the translated block into the instruction. Otherwise, DTS 200 modifies the branch to return to box 212.

Next, the translated code block 222 is stored in translated code cache 208. Note that boxes 228 and 230 are discussed below with respect to FIG. 3. Then, DTS 200 executes code block 222. Since code block 222 is the first translated block, neither of its terminating branch targets have been translated. Therefore, DTS 200 goes back to box 212 when it reaches the terminating branch of code block 222.

Once DTS 200 returns to box 212, it looks up the target address in AMT 218. Since no translation yet exists for the target address, DTS 200 moves to box 216. At box 216, DTS 200 translates and adds profiling code to the block of code 224 containing the target address. Then, DTS 200 stores the newly translated code block 224 in cache 208. Next, DTS 200 retranslates block 222 so that, the next time the branch instruction is taken, the branch jumps directly to block 224. Finally, DTS 200 executes block 224. Note that the above retranslation technique, called "branch backpatching," speeds execution by allowing DTS 200 to execute the majority of code blocks from within cache 208.

Some code blocks, such as block 226, however, terminate with a dynamic branch instruction. Since the targets of a dynamic branch cannot be computed until the code block is executed, DTS 200 will always return to box 212 after termination. Once back at box 212, the target block can be determined by a lookup in AMT 218.

Returning to FIG. 1, the transition from simulated to native execution begins when a timer signal arrives at step 110. This signal is an asynchronous signal and, accordingly, can arrive at any time. At the instant the signal arrives, therefore, DTS 200 might be executing in an unknown state. That is, a state with no direct corresponding state in the native application.

Consider, for example, code block 222 in FIG. 2. Since code block 222 has been translated and instrumented with profiling code, the instructions within code block 222 do not necessarily correspond to the instructions within the native code block. Therefore, if the timer signal arrives while DTS 200 is in the middle of executing code block 222, the state of DTS 200 is unknown because it does not precisely map to a state in the native application.

However, the beginning of each translated code block directly corresponds to the beginning of a code block in the native application. Therefore, the beginning of each translated code block is a known state. Accordingly, if DTS 200 stops execution at the beginning of a code block, then the signal handler can build a simulated machine context from which the native application can resume execution.

Figure 3:
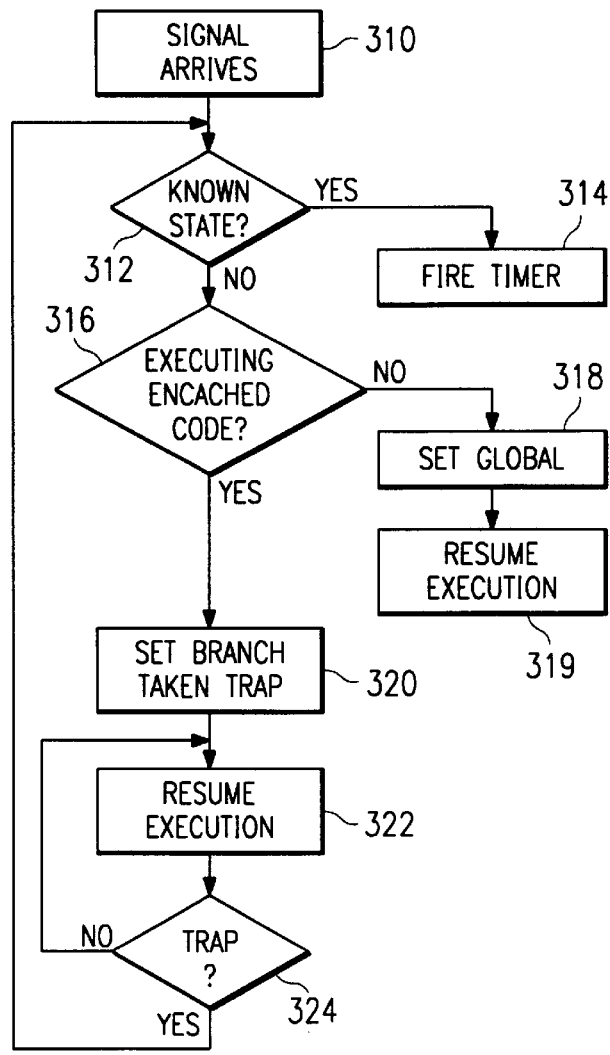
FIG. 3 is a flow chart illustrating the mechanism by which the dynamic translation system ensures that it stops at a known state.

FIG. 3 is a flow chart illustrating the mechanism by which DTS 200 ensures that it stops at a known state. At step 310, the asynchronous timer signal arrives at DTS 200. At step 312, DTS 200 determines whether it is currently at a known state. In order to make this determination, DTS 200 compares the address in the PC with the data structures shown in FIG. 2. Specifically, DTS 200 checks to see whether the PC address is in AMT 218 or block information table 220. If so, then the PC address is the beginning of a translated block and DTS 200 is in a known state.

If the PC address is not in AMT 218 or block information table 220, then DTS 200 is in an unknown state. If DTS 200 is translating a code block in box 216 or looking up an address in AMT 218 or block information table 220 when the signal arrives (step 316), then DTS 200 sets a global variable to indicate that the timer fired. Then, DTS 200 resumes execution (step 319). Returning briefly to FIG. 2, before DTS 200 executes a code block in cache 208, it checks the global variable to determine whether the timer signal has arrives (box 228). If so, then DTS 200 commands the OS to send the timer signal again (box 230). This signal is trapped by its handler, which resets the timer and transfers control to the native application as described above in FIG. 1, step 110.

If DTS 200 is executing code within translated code cache 208 when the signal arrived (step 316), then DTS 200 sets computer system 400's "branch taken" trap (step 320). This trap is causes computer system 400 to stop every time it takes a branch. Next, the branch taken trap is armed with a signal handler that captures the machine state. Then, DTS 200 resumes execution (step 322).

At step 324, CPU 410 executes a branch instruction and the trap occurs. Accordingly, the signal handler takes a new snapshot of the simulated machine state. Next, DTS 200 returns to step 310, where DTS 200 determines whether the target of the branch is a known state.

If DTS 200 is in a known state, then it moves to step 314. At step 314, DTS 200 commands the OS to send the timer signal again. This signal is trapped by its handler, which resets the timer and transfers control to the native application, as described above in FIG. 1, step 110.

Although the present invention and its advantages have been described in detail, it should be understood that various changes, substitutions and alterations can be made herein without departing from the spirit and scope of the invention as defined by the appended claims.

What is claimed is:

1. A method of profiling a native application, the method comprising the steps of:

dynamically translating the native application to produce a translated application;

executing the native application until reaching a first state;

executing the translated application from the first state to a second state and collecting profile data therefrom; and executing the native application from the second state.

2. The method of claim 1, wherein the second state is a known state.

3. The method of claim 1, further comprising the step of:

allocating a stack and a heap for the instrumented application.

4. The method of claim 1, further comprising the step of:

setting a timer to fire after predetermined time intervals, wherein execution of the native application stops when the timer fires and the execution of the translated application stops when reaching the second state after the timer fires.

5. The method of claim 1, wherein the step of dynamically translating further comprises the steps of:

taking a snapshot of a machine state;

determining a program counter address from the snapshot; and translating a code block from the native application beginning at the program counter address to produce a translated code block.

6. The method of claim 5, further comprising the step of:

looking up the program counter address in an address table to determine whether the code block has previously been translated.

7. The method of claim 5, further comprising the step of:

storing the translated code block in a cache, wherein the translated application is executed from the cache.

8. The method of claim 7, further comprising the step of:

backpatching a terminating branch instruction in the translated code block to jump to a second translated code block in the cache.

9. A computer program product having a computer readable medium having computer program logic recorded thereon for profiling an application executing on a computer system, the computer program product comprising:

means for stopping execution of the application at a first state;

means for instrumenting the stopped application;

means for executing the instrumented application, the execution beginning at the first state;

means for stopping execution of the instrumented application at a second state; and means for resuming execution of the application, the resumption beginning at the second state;

wherein the means for instrumenting includes means for adding profiling instructions to the stopped application, wherein the profiling instructions collect profile data when the instrumented application is executed.

10. The computer program product of claim 9, wherein the means for stopping execution of the instrumented application comprises:

means for receiving a stop signal; and means for stopping execution of the instrumented application in response to the stop signal when the instrumented application is in a known state, wherein the known state is the second state.

11. The computer program product of claim 9, wherein the means for resuming execution of the application comprises:

means for creating a simulation context from the instrumented application; and means for substituting the simulation context for a machine context generated by the computer system.

12. The computer program product of claim 9, wherein the means for adding profiling instructions comprises:

means for determining a next address to execute in the stopped application;

means for translating a code block beginning at the next address; and means for storing the translated code block in a cache.

13. The computer program product of claim 9, wherein both stopping means comprise:

timer means for generating a timer signal after a time interval.

14. A method of profiling an application executing on a computer system, the method comprising the steps of:

setting a timer to fire;

executing the application until the timer fires;

after the timer fires, dynamically translating the application into an instrumented application;

executing the instrumented application until the timer fires;

after the timer fires, generating a simulated machine context having a state from the instrumented application; and resuming execution of the application from the state of the simulated machine context.

15. The method of claim 14, wherein the step of dynamically translating comprises the steps of:

looking up a next address to execute in a table;

if the next address is not in the table, translating a code block beginning at the next address; and storing the translated code block in a cache.

16. The method of claim 14, wherein the dynamically translating step occurs concurrent with the step of executing the instrumented application.

17. The method of claim 14, wherein the step of generating a simulated machine context comprises the step of:

executing the instrumented application until the instrumented application reaches a known state; and wherein the simulated machine context is generated from the known state.

18. The method of claim 14, wherein the step of resuming execution comprises the step of:

substituting the simulated machine context for a machine context of the computer system.

* * * * *